K. FANTA, A. REGAL, H. VIETZE & N. WESSELY.
ELECTRIC JACQUARD MACHINE.
APPLICATION FILED MAY 13, 1913.

1,091,882.

Patented Mar. 31, 1914.

K. FANTA, A. REGAL, H. VIETZE & N. WESSELY.
ELECTRIC JACQUARD MACHINE.
APPLICATION FILED MAY 13, 1913.

1,091,882.

Patented Mar. 31, 1914.
8 SHEETS—SHEET 3.

K. FANTA, A. REGAL, H. VIETZE & N. WESSELY.
ELECTRIC JACQUARD MACHINE.
APPLICATION FILED MAY 13, 1913.

1,091,882.

Patented Mar. 31, 1914.
8 SHEETS—SHEET 4.

K. FANTA, A. REGAL, H. VIETZE & N. WESSELY.
ELECTRIC JACQUARD MACHINE.
APPLICATION FILED MAY 13, 1913.

1,091,882.

Patented Mar. 31, 1914.
8 SHEETS—SHEET 5.

K. FANTA, A. REGAL, H. VIETZE & N. WESSELY.
ELECTRIC JACQUARD MACHINE.
APPLICATION FILED MAY 13, 1913.

1,091,882.

Patented Mar. 31, 1914.
8 SHEETS—SHEET 6.

K. FANTA, A. REGAL, H. VIETZE & N. WESSELY.
ELECTRIC JACQUARD MACHINE.
APPLICATION FILED MAY 13, 1913.

1,091,882.

Patented Mar. 31, 1914.
8 SHEETS—SHEET 7.

K. FANTA, A. REGAL, H. VIETZE & N. WESSELY.
ELECTRIC JACQUARD MACHINE.
APPLICATION FILED MAY 13, 1913.

1,091,882.

Patented Mar. 31, 1914.
8 SHEETS—SHEET 8.

Witnesses:
Elsie Swenson
Ray J. Ernst

Inventors:
Karl Fanta, August Regal
Hans Vietze and Norbert Wessely
by
Attorneys.

UNITED STATES PATENT OFFICE.

KARL FANTA, AUGUST REGAL, HANS VIETZE, AND NORBERT WESSELY, OF VIENNA, AUSTRIA-HUNGARY, ASSIGNORS TO OESTERREICHISCHE SIEMENS-SCHUCKERT-WERKE, OF VIENNA, AUSTRIA-HUNGARY, A CORPORATION OF AUSTRIA, AND REGAL-PATENTE-GESELLSCHAFT M. B. H., OF VIENNA, AUSTRIA-HUNGARY, A CORPORATION OF AUSTRIA.

ELECTRIC JACQUARD-MACHINE.

1,091,882. Specification of Letters Patent. Patented Mar. 31, 1914.

Application filed May 13, 1913. Serial No. 767,486.

*To all whom it may concern:*

Be it known that we, KARL FANTA, AUGUST REGAL, HANS VIETZE, and NORBERT WESSELY, citizens of the Austro-Hungarian Empire, and residing at Vienna, Austria-Hungary, have invented certain new and useful Improvements in Electric Jacquard-Machines, of which the following is a specification.

Our invention relates to improvements in machines for reproducing patterns, figures, pictures and photographs, electric currents being employed.

The invention will be described with reference to machines for textile purposes, and particularly to an electric jacquard machine for making figured fabrics of all kinds without using cards, such as are described in the United States Patents Nos. 983,862 and 1,017,063.

The details of a machine embodying the various features of our invention are illustrated by way of example in the accompanying drawings, wherein:—

Figure 1 is a diagram of connections for a machine of the type referred to; Fig. 2ª is a similar view of a modification thereof; Fig. 2ᵇ is an end elevation of the same modification; Fig. 2ᶜ is a front elevation of a further modification of the exchangeable controlling units, and Fig. 2ᵈ is a transverse vertical section of the same. Fig. 5ª is a front elevation of the apparatus shown in Fig. 5 associated with the elements shown in Fig. 2; and Fig. 5ᵇ is an end elevation of the same.

Figure 1:
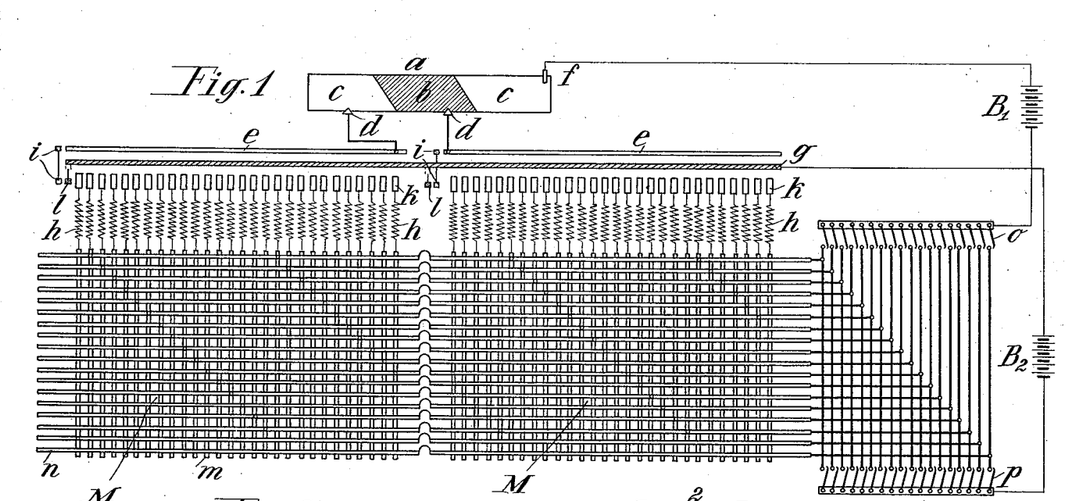

Referring to Fig. 1, $a$ designates an example of a pattern cylinder which is mounted on a rotatable roller and comprises the electro-conductive figure portion $b$ and the electro-non-conductive ground portion $c$. $d$ are the contact-pieces or feelers which receive the current and are connected with electro-conductive bars $e$. Each of these bars $e$ receives current from a battery $B_1$ over the brush $f$ on the pattern cylinder when the feeler $d$ associated therewith is on a conductive portion of the cylinder, and is currentless when its feeler is on a non-conductive portion. In order, however, to obtain a weave for the ground of the web when a bar $e$ is currentless, additional bars $g$ are arranged parallel to these bars and are electrically connected directly with the battery $B_2$. From the bars $e$ the current is supplied to the various solenoids $h$ by means of double brushes $i$ which slide on the one hand on these bars, and on the other hand on the various contact-blocks $k$ and are moved synchronously with the feelers $d$. The solenoids $h$ are employed for example to control the needles which effect a lifting or a leaving in normal position of the heddles, and thus of the warp threads, and as shown for example in U. S. patent to Regal No. 1,017,063. When the bars $e$ are currentless, current can be supplied by the second battery $B_2$ to the solenoids $h$ over the bars $g$ by means of the double brushes $l$ which are coupled to, but insulated from the double brushes $i$. From these solenoids the current flows over the transverse bars $m$ and longitudinal bars $n$ of the line-selector, which must be connected according to the desired weave, and from here it returns in the one case over the figure-weave switches $o$ to the battery $B_1$ and in the other case over the ground weave switches $p$ to the battery $B_2$. These weave-controlling switches $o$ and $p$ are opened and closed in known manner by means of lifting cams or the like which are arranged successively in chain form and give combinations suited to the kind of weave desired.

Figure 2:
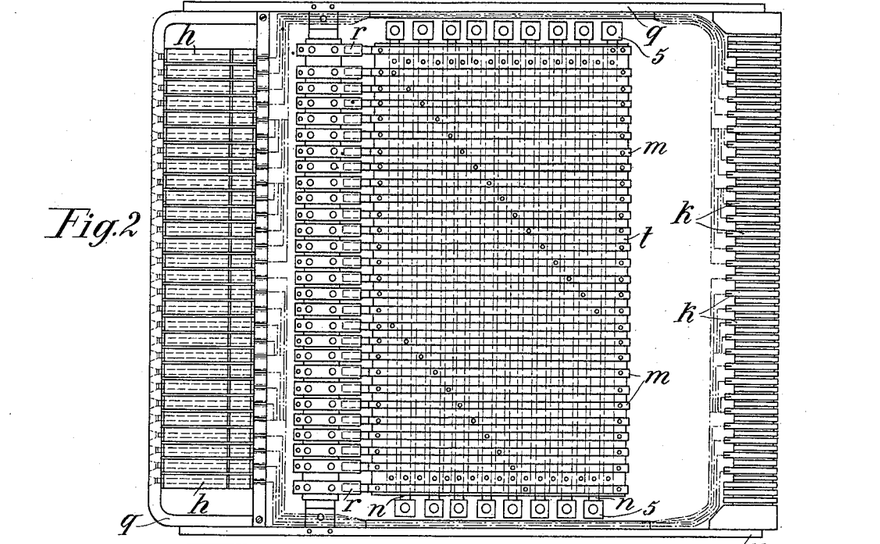
Fig. 2 is a top-plan view of one of the exchangeable controlling units according to our invention.
Figure 2A:
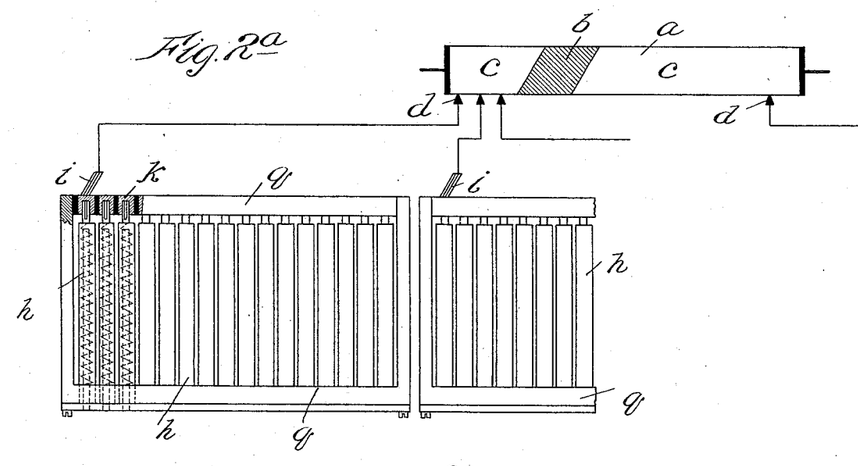
Figure 2B:
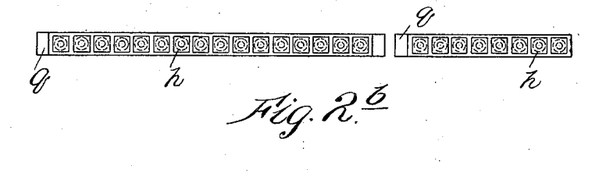
Figure 2C:
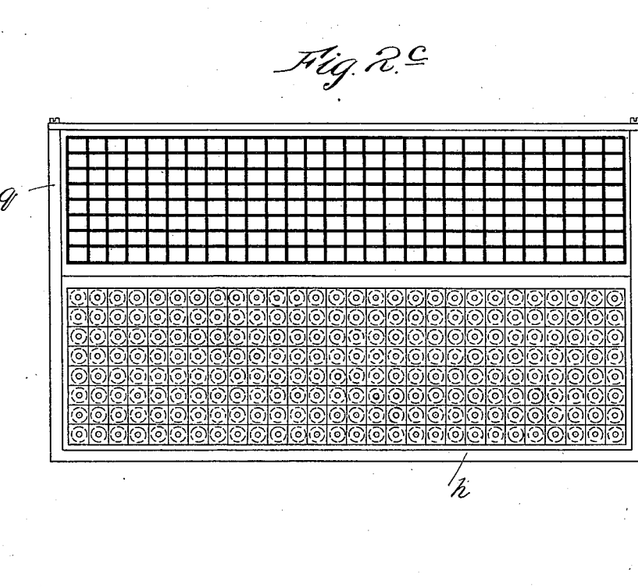
Figure 2D:
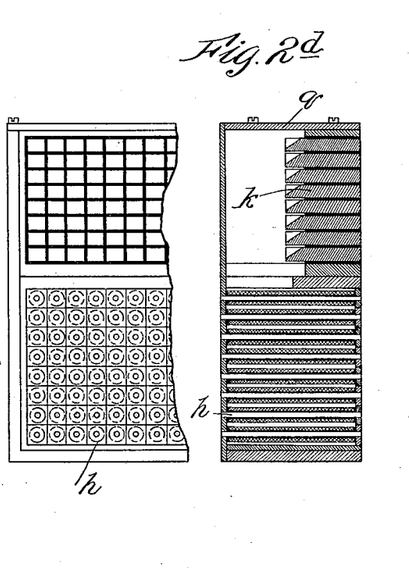

Fig. 2 shows an example of a device for machines of the character described in which, in accordance with our invention, the solenoids *h*, the line-selector M comprising the bars *m* and *n*, and the row of contact-blocks *k* are united as one unit in a single frame. As clearly shown in this figure, the various parts are held together by suitably formed iron bars *q*, and the line-selector itself can be readily exchanged because it is held in resilient contact-clamps *r* only by means of projections of the transverse bars *m*, which are slid into the clamps, and can be removed by being withdrawn from these clamps. The solenoids are arranged in a series at one side of the frame and opposite to them at the other side of the frame the contacts *k* are arranged, one for each solenoid. The line selector comprising transverse and longitudinal bars *m* and *n* is disposed between the solenoids and the contacts. The solenoids may be connected in groups as desired, and the longitudinal bars *n* carry at one end thereof bored contact-blocks 5 for connecting together those line-selectors arranged one above another which belong to the various groups of solenoids. The electrical connections between the various parts are partly shown in Fig. 2 and will be clearly understood by reference to the diagram Fig. 1. The conductors leading from the several contacts *k* of the step switch which they constitute, to the respective solenoids *h* are suitably housed together on each side of the frame. Each solenoid *h* is connected to the binding post or connection *r* of its corresponding transverse rail *m* of the line selector. By means of the bored contacts 5, above referred to, disposed at one end of the longitudinal rails *n*, the line selectors of the several groups of solenoids are connected together, and the first or the last selector, for example, is connected with the switches *o* and *p*. Our invention is not limited to the specific arrangement shown in Fig. 2, but this figure is intended only as an example of a principle of construction, which may be followed out and enlarged upon in numerous different ways, without departing from the spirit of the invention. Owing to the whole of the coöperating elements being compactly arranged in this manner in a number of groups which are incorporated in a frame, it is possible to readily exchange damaged parts because the various groups containing defective elements can be simply replaced by spare groups, *i. e.* spare units, kept in stock; the frequently tedious search for, and replacement of, a damaged element can thus be carried out elsewhere without disturbing the operation of the apparatus.

In another embodiment of our invention we unite in a single unit, as shown in Figs. 2$^a$ and 2$^b$, all those solenoids, which are each associated with one of the feelers at the pattern cylinder, with the appertaining multiple switch and, if need be, with other elements. Since when a fault appears in the web, the feeler which is touching the corresponding part of the pattern cylinder must be immediately discovered, the said arrangement has the special advantage that the faulty unit is in this manner immediately determinable and can be exchanged in a very short space of time.

In a further embodiment of our invention, as shown in Figs. 2$^c$ and 2$^d$, we unite in one single unit as many solenoids or magnets with their contact-blocks as mechanical elements make up one group in the usual grouping at the textile machine in question. For example, it is customary in jacquard apparatus to assemble the whole of the needles in groups in such a way that each standard size of the machine is built with a corresponding number of such groups, for example, an 800-machine with 2 groups (so-called 400-machines), a 2000-machine with 5 groups, and so on. Owing to this arrangement the incorporation of our new apparatus in existing types of textile machines is very simply carried out without such machines needing to be remodeled. In the unit shown by way of example in Fig. 2 the solenoids *h* and the contact-blocks *k* of the multiple switch are connected in series. This arrangement is disadvantageous in that it is not possible to check or exchange individual solenoids without taking the unit from the framework of the machine. This difficulty is obviated by arranging that the contact-blocks of the multiple switch and the solenoids on the same side of the unit are so superposed or juxtaposed that each of these elements is freely accessible.

Figure 3:
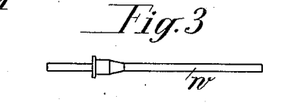
Fig. 3 is a side elevation of a solenoid-core, and Fig. 4 a section of a solenoid comprising our improved winding.
Figure 4:
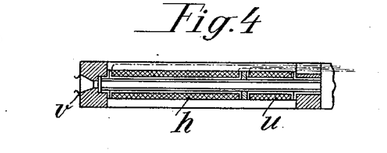

Since the individual solenoids have in every case a comparatively large amount of self-induction provision must be made for counteracting its effects by suppressing or obviating sparking at those places at which the circuit is broken, in the present case at the multiple switch and at the pattern cylinder. To this end, as shown in Fig. 4, we connect in parallel with the winding of each solenoid a bifilar winding *u* in which the current can flow and destroy its own field. A further improvement we make in the construction of the solenoids or electromagnets consists in providing on the solenoid or outside the same, *e. g.* at the mouth thereof, a suitably formed clamping spring *v* whose function is to receive and damp the shock and recoil of the solenoid-core *w* (Fig. 3), for the purpose of securely holding the core *w* in its attracted position and preventing it from becoming accidentally loosened, an effect which might result in faulty operation of the machine or in faulty work being produced thereby. The means for returning the cores to normal position forms no part of my present invention and hence the same is not illustrated herein, but those skilled in this art are familiar with devices suitable for this purpose, as for example that shown in U. S. patent to Regal, No. 1,017,063. As will be understood from Figs. 3 and 4, when the core $w$ is drawn into the solenoid, the spring $v$ will slide on the conical portion and rub against the larger portion of the core $w$, will check the motion thereof, and will receive the shock of and finally securely hold the core. Consequently, the solenoid-core is prevented from subsequently becoming loose owing to the vibration of the machine.

Figure 5:
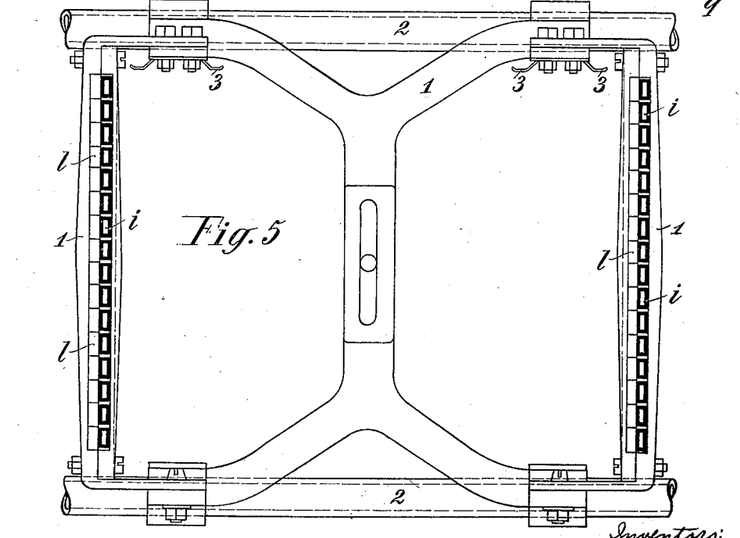
Fig. 5 is an elevation of the contact-apparatus for supplying current to the controlling units.
Figure 5A:
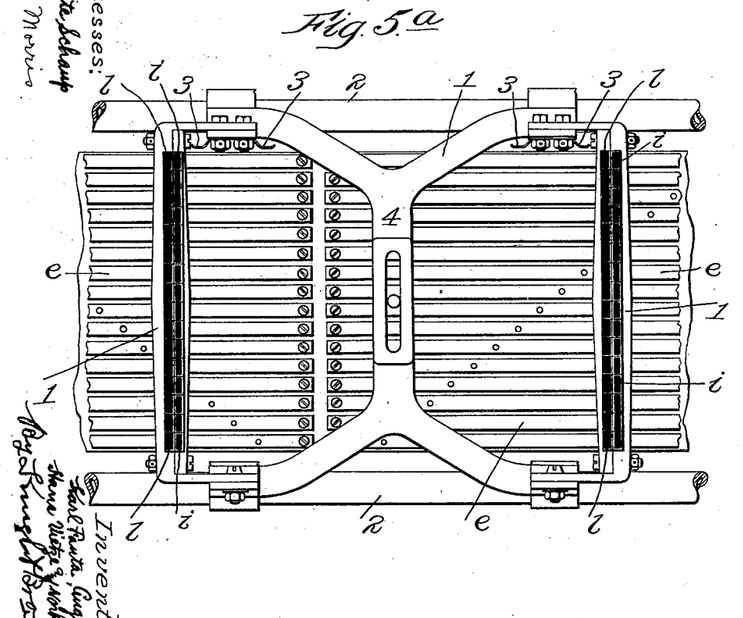
Figure 5B:
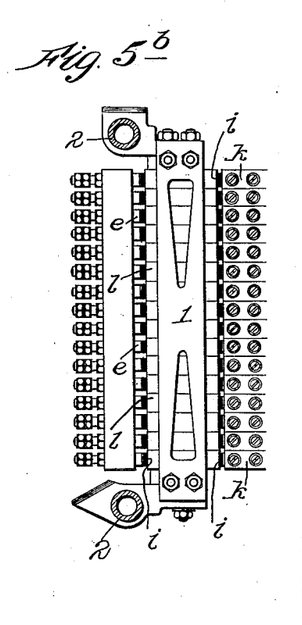
Figure 6:
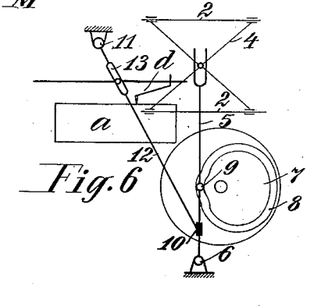
Fig. 6 is a diagrammatic view of a system of interconnected levers for driving the contact-apparatus and the feelers on the pattern cylinder in synchronism with one another.

As already stated the unit-frames, one of which is illustrated by way of example in Fig. 2, and which comprise groups of solenoids, line selector, and the appertaining contact-blocks, are arranged one above another and, when the number is large, side by side. We accordingly provide the common contact-apparatus illustrated in Figs. 5, 5<sup>a</sup> and 5<sup>b</sup> for the various rows of contact-blocks in order to transmit the current between these contact-blocks and the bars $e$ or the source of current $B_1$, and between these contact-blocks and the source of current $B_2$. The rows of contact-blocks or the appertaining unit frames are in this case arranged one above another and in two piles side by side. The contact-apparatus (Fig. 5) comprises two systems of brushes, one of which systems consists of double brushes $i$ insulated from one another and from the frame of the machine; one brush of each of these double brushes slides on the multiple switch blocks and the other on the contact-bar $e$ parallel and opposite to the various multiple switch blocks, as may be seen from the diagram Fig. 1, and serve to supply the current from the battery $B_1$ to the solenoids when the feeler $d$ is on a conductive portion of the pattern cylinder. The other system consists of the brushes $l$ which are uninsulated, i. e. are conductively connected together and with the framework or the frame 1 of the contact-apparatus, and as mentioned above, move synchronously with the brushes $i$ over the rows of contact-blocks. The current flows from the battery B, to the brushes $l$ owing to one pole of the battery $B_2$ being connected with the framework of the machine. By means of such an arrangement current can be supplied to each solenoid from the source of current $B_1$ or $B_2$, assuming that the appertaining weave forming switch $o$ or $p$ is, at the moment the appertaining contact-piece $k$ is being contacted, connected through at the multiple switch block by means of a brush of the one or the other system, and the path of the current on the pattern cylinder $a$ is not interrupted. In order that the machine may be operated correctly this contact-apparatus must move synchronously with the pattern cylinder feelers $d$, except that the path traversed by the brushes is a large multiple of the path along which the feelers at the pattern-cylinder have to move. Now in order to obtain the necessary gear-ratio between the two motions several toothed wheels have heretofore been employed which, however, owing to the unavoidable back-lash between the teeth, cause in practice undue inaccuracy. It is obvious that owing to the comparatively very short path of the feeler $d$ very accurate adjustment must be able to be made. According to our invention we obtain the necessary gear-ratio and the required precision by means of a plurality of preferably adjustable levers, as shown by way of example in Fig. 6. Here 4 designates the contact-apparatus shown in Fig. 5, and 2 the guide-rods for the same. This contact-apparatus is engaged by a forked-lever 5, which is fulcrumed at the point 6 and is rocked by a cam-disk 7 having a groove 8 and block 9. To the point 10 of the lever 5 is slidably and rotatably fastened the lever 12 which can rock about the axle 11 and moves the pattern-cylinder feelers $d$ which are carried by means of suitable devices in the slot 13 and are adjustable in various directions. In order to obtain practically exact synchronism between the pattern-cylinder feelers and the contact-apparatus, it is obviously necessary that the center of oscillation 11 of the lever 12 be located exactly vertically above that of the lever 5, and it is only with a view to clearness and simplicity that the figure illustrates an arrangement wherein this condition is not fulfilled. When this device is operated, the contact-apparatus will move a distance equal to the length of one block of the multiple switch, while the point 10 moves a very much shorter distance. The motion of the point 10 is again reduced to a smaller motion by the point of application of the common carrying device of the various pattern-cylinder feelers $d$ being arranged near the fulcrum 11. Since the gear-ratio can be readily chosen as desired in this manner and as disturbing play in the mechanism can be avoided, the required precision is therefore obtained and the desired conditions are fulfilled.

In the positive transmission of motion between the weave switches and the pattern cylinder there must be great accuracy and any sliding or slipping must be avoided. For this purpose we have constructed a new form of rubbing drive for adjustable ratio of transmission, the rubbing parts or surfaces of which are provided with corresponding wart-like projections and depressions, which engage with each other in operation and prevent absolutely any lagging of one part behind the other. In the example illustrated in Figs. 7 and 8, the rubbing wheel 14 of the drive has depressions 15, while the other rubbing wheel 16, adjustable on its axis, has inserted fingers 17, which engage with the corresponding depressions during the operation of the wheels or disks against each other.

Figures 7, 8:
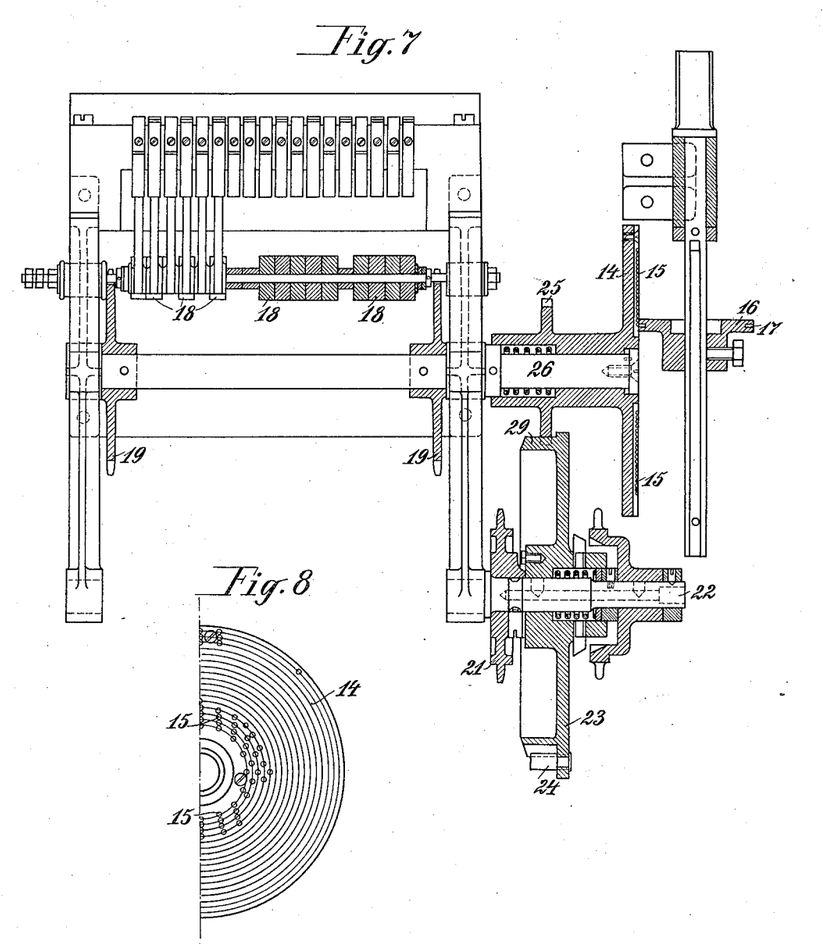
Fig. 7 is a side elevation, partly in section, showing the weave controlling switch and the mechanism for driving the same.
Fig. 8 is a front half-elevation of our improved friction disk.
Figure 9:
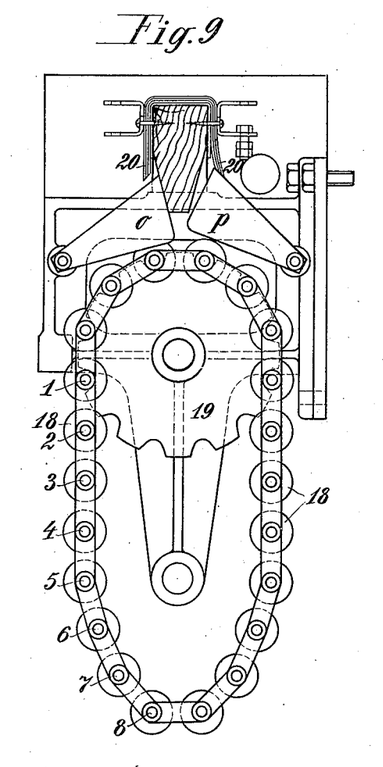
Fig. 9 is an end elevation, partly in section, showing the switch illustrated in Fig. 7.

In order to provide the fabric manufactured on the machine with the required pattern and ground, as mentioned above with reference to Fig. 1, the so-called weave switches are required which open and close the various circuits to the solenoids without regard to the pattern to be woven but only with regard to the required weave for the fabric (Figs. 1, 7 and 9). These switches are opened and closed, as is well known, by means of lifting members arranged in a row like a chain, i. e. so-called lifting rollers. According to our invention the weave switch comprising the preferably readily exchangeable lifting members 18 (Figs. 7 and 9) arranged in the form of a chain is constructed in such a manner that, in respect to the sequence, all even-numbered chain-pins, thus the 2nd, 4th, 6th, 8th, carry the lifting members for the ground switches $p$ and all odd-numbered chain-pins, thus the 1st, 3rd, 5th, 7th, carry those for the pattern switches $o$, or vice versa, and the feed mechanism 19 always advances two of such members or links simultaneously, for the purpose, firstly, of accommodating both the movable contact-piece of the weave switch $o$ for the figures and those of the switch $p$ for the groundwork in a single casing, or as it were in a common switch, each two of such contact-pieces being arranged opposite to one another if desired at the same level, and, secondly, of being able to actuate them by means of a single chain. According to our invention, contact is made at the weave switch itself by the contact-pieces $o$, $p$ of the switch, which are preferably made in the form of plates, being pressed by the lifting members 18 of the chain against resilient contact springs 20. As soon therefore as a roller 18 comes below one of the contact-pieces $o$ or $p$, the latter is pressed against the contact spring 20 and the circuit is closed, whereas when there is no roller on the chain-pin, the movable contact-piece remains at rest and the circuit therefore is not closed. The electrical connections of the weave switch will be readily understood from Fig. 1. The weave switch is driven by the same shaft as drives the cam disk 7 (Fig. 6) by means of a chain and sprocket-wheels 21 (Fig. 7), the gear-ratio being 1:1. On the axle 22 of the sprocket-wheel 21 (Fig. 7) is mounted the driving disk 23 having two driving pins 24, which drive the wheel 25 and, consequently, the friction-wheel 14 and the feed mechanism 19 of the weave switch, the gear-ratio being 1:2.

Figure 10:
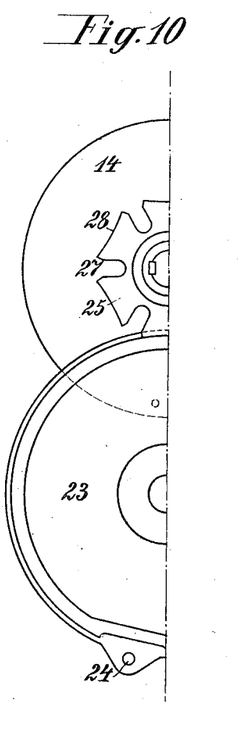
Fig. 10 is a rear half-elevation of the mechanism for driving said controlling switch.

It is necessary that the weave switch and the pattern-cylinder be rotated twice while the eccentric 7 makes one revolution, because then the contact-apparatus has moved to-and-fro over the multiple switches and because this operates during both its outward and its return movement and therefore two weft threads are inserted during this time, so that two cross-weaves must result. After the feed motion has taken place it is absolutely necessary that both the driving mechanism of the weave switch and the pattern-cylinder be immovably held in position. Heretofore their drive and retention have been effected by means of toothed wheels, levers, ratchet-wheels and detents, an arrangement which owing to the amount of play arising must be unsatisfactory. Our improved driving and retaining mechanism preferably comprises a star-wheel 25, a so-called Maltese cross, mounted on the axle 26, by means of which both the gear ratio and the desired locking are obtained (Fig. 10). The Maltese cross 25 is driven by means of the two driving pins 24 of the disk 23, one of which engages in the notches 27 and rotates the Maltese cross one tooth, provision being made for this by suitably forming or recessing the disk 23. After this rotation of the Maltese cross, the concave outer face 28 of one arm of the cross abuts against the circular periphery 29 of the disk 33, whereby the said cross is prevented from rotating further, and cannot indeed rotate in either the one direction or the other. Hence during each half revolution of the disk 23 the Maltese cross is fed one tooth by means of the pins 24 and after each periodic sudden advance is held locked. The desired object, to suitably advance the weave stitch and the pattern-cylinders in steps and to lock them after each movement, is thus attained in a very simple manner.

Figure 11:
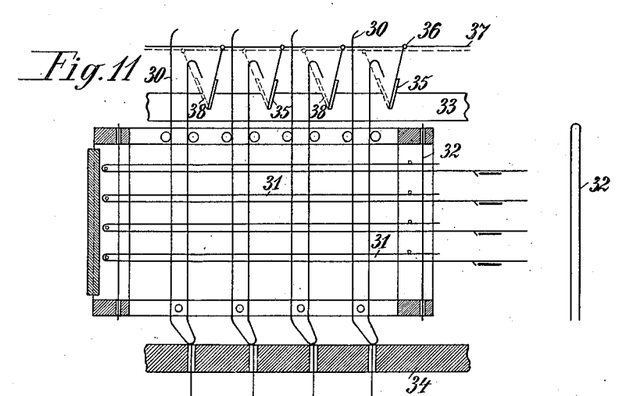
Figs. 11 and 12 are elevations showing our improved needle and knife frames.
Figures 12, 13:
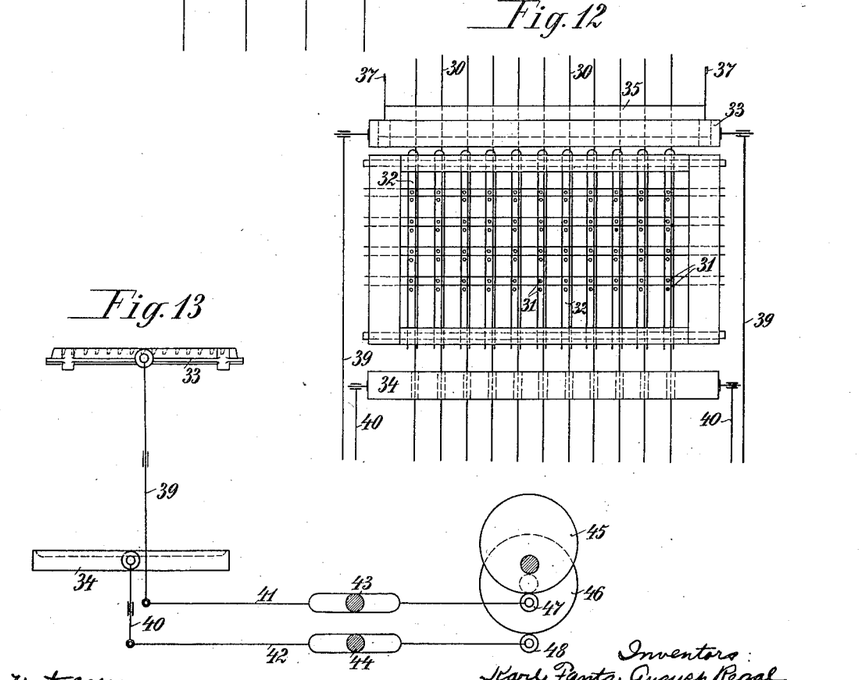
Fig. 13 is a diagrammatic view of our improved means for varying the size of the shed.

Figs. 11 and 12 illustrate the arrangement of lifting-hooks 30, the needles 31 and the separators 32, and guides appertaining thereto, as well as the lifting frame 33 and lifting-hook support 34. In order to prevent the needles 31 in one horizontal row from getting out of place, so-called separators have been arranged between the needles. Heretofore, between each pair of adjacent needles a pin having a width corresponding to the distance between the needles was inserted between them. This construction is however disadvantageous in that, when such a pin is removed, the needles directly adjacent to one another are no longer kept apart but can come together, which would cause considerable trouble on the exchange of such needles becoming necessary. According to our invention, for keeping the needles at a correct distance apart we provide a guide-pin of special form for each of the vertical rows of needles in such manner that each needle is as it were embraced as by a fork by these guide-pins. When therefore a guide-pin is removed, the needles previously embraced thereby cannot have mixed with those in the same horizontal rows.

A further feature of our invention is embodied in the special arrangement of the knives 35 in the lifting frame 33. Heretofore these have always been fast in their frame, an arrangement which is found disadvantageous when it becomes necessary to exchange the hooks 30. We therefore provide knives which are movable and are preferably connected with rods 37 by means of suitable joints 36, so that when these rods are pulled, the knives can be readily moved from the working position 38 indicated by dotted lines into that indicated by full lines, and when required can be entirely removed from the lifting frame. Exchange of the hooks 30 is thereby considerably simplified and facilitated.

In order to vary the size of the shed in looms, i. e. to vary the height of the upper shed and depth of the lower, the one arm of the two-armed lever employed for the shed has heretofore been shortened or lengthened, or the driving eccentric has been exchanged, in which case a suitable intermediate lever had to be employed. According to our invention, we vary the size of the shed by shifting the fulcrum of the two-armed lever for forming the shed. One embodiment of this feature of our invention is illustrated in Fig. 13. The two-armed slotted levers 41, 42 which drive the lifting frame 33 and hook-support 34 respectively by means of the guide rods 39, 40, permit an adjustment of their fulcrum 43, 44, whereby the gear-ratio of the rocking motion produced by the eccentrics 45, 46, and the antifriction rollers 47, 48 of the levers 41, 42 bearing thereon can be varied. It is evident that no intermediate levers are required, and that by a small adjustment of the fulcrums 43, 44, a considerable change can be made in the size of the shed which is formed.

The herein described devices are not limited in employment, as already mentioned, to electric jacquard machines producing figured webs, but can obviously be correspondingly applied to and employed in all machines for reproducing figures, patterns, designs and the like by means of the electric current.

We claim:—

1. In electric jacquard apparatus, the combination of a plurality of solenoids adapted to control the warp threads and divided into groups, each group of solenoids being connected to a group of contact-blocks and to a line selector, and means for uniting the groups of solenoids, contact-blocks and line selectors to form one exchangeable unit.

2. In electric jacquard apparatus, the combination of a plurality of solenoids adapted to control the warp threads and divided into groups, each group of solenoids being connected to a group of contact-blocks and to a line selector, and a frame uniting each group of solenoids, the contact-blocks associated therewith and a line selector to form one exchangeable unit.

3. In electric jacquard apparatus, the combination of a plurality of solenoids adapted to control the warp threads and divided into groups, each group of solenoids being connected to a group of contact-blocks and to a line selector, a contact-apparatus for transmitting current to the groups of contact-blocks, and means for uniting the groups of solenoids, contact-blocks, contact-apparatus and line selectors to form one exchangeable unit.

4. In electric jacquard apparatus, the combination with a pattern cylinder and feelers movable thereon, of a plurality of solenoids adapted to control the warp threads and divided into groups, each group of solenoids being connected to a group of contact-blocks and to a line selector, and a frame uniting each group of solenoids, the contact-blocks associated therewith and a line selector to form one exchangeable unit, each group of solenoids and the contact-blocks associated therewith being connected to one of said feelers.

5. In electric jacquard apparatus, the combination of a plurality of solenoids adapted to control the warp threads and divided into groups, each group of solenoids being connected to a group of contact-blocks and to a line selector, and means for uniting the groups of solenoids, contact-blocks and line selectors to form one exchangeable unit, each unit being associated with a group of the normal number of lifting hooks.

6. In electric jacquard apparatus, the combination of a plurality of solenoids adapted to control the warp threads and divided into groups, each group of solenoids being connected to a group of contact-blocks and to a line selector, and means for uniting the groups of solenoids, contact-blocks and line selectors to form one exchangeable unit, each group of solenoids and its contact-blocks associated therewith being juxtaposed on the same side of said unit.

7. In electric jacquard apparatus, the combination of a plurality of solenoids adapted to control the warp threads and divided into groups, each group of solenoids being connected to a group of contact-blocks and to a line selector, and means for uniting the groups of solenoids, contact-blocks and line selectors to form one exchangeable unit, each group of solenoids and its contact-blocks associated therewith being superposed on the same side of said unit.

8. In electric jacquard apparatus, the combination of a plurality of solenoids adapted to control the warp threads and divided into groups, each group of solenoids being connected to a group of contact-blocks and to a line selector, and a frame uniting each group of solenoids, the contact-blocks associated therewith and a line selector to form one exchangeable unit, each line selector comprising an insulating plate, a plurality of longitudinal bars on one side thereof and a plurality of transverse bars on the other side thereof, and members passing through said plate and electrically connecting the bars on opposite sides thereof.

9. In electric jacquard apparatus, the combination of a plurality of solenoids adapted to control the warp threads and divided into groups, each group of solenoids being connected to a group of contact-blocks and to a line selector, and means for uniting the groups of solenoids, contact-blocks and line selectors to form one exchangeable unit; and a brush-frame comprising a group of brushes movable over the contact-blocks of said unit.

10. In electric jacquard apparatus, the combination of a plurality of solenoids adapted to control the warp threads and divided into groups, each group of solenoids being connected to a group of contact-blocks and to a line selector, and means for uniting the groups of solenoids, contact-blocks and line selectors to form exchangeable units, a brush-frame comprising a group of brushes movable over the contact-blocks of each unit, and means for coupling the brush-frames together.

11. In electric jacquard apparatus, the combination with a pattern-cylinder and two sources of current, of a plurality of solenoids adapted to control the warp-threads and divided into groups, each group of solenoids being connected to a group of contact-blocks and to a line selector, and means for uniting the groups of solenoids, contact-blocks and line selectors to form one exchangeable unit; two sets of brushes movable over the contact-blocks, the one set being adapted to connect the one source of current with said solenoids, and the other being insulated from one another and adapted to connect the second source of current over the pattern-cylinder with the solenoids.

12. In electric jacquard apparatus, the combination with a pattern-cylinder and two sources of current, of a plurality of solenoids adapted to control the warp threads and divided into groups, each group of solenoids being connected to a group of contact-blocks and to a line selector, and means for uniting the groups of solenoids, contact-blocks and line selectors to form one exchangeable unit; two sets of brushes movable over the contact-blocks, the one set being connected to the frame of the machine and adapted to connect the one source of current with said solenoids, and the other being insulated from one another and from said frame and adapted to connect the second source of current over the pattern-cylinder with the solenoids.

13. In electric jacquard apparatus, the combination of a pattern-cylinder, feelers movable thereon, a plurality of solenoids for controlling the warp threads, a movable contact-apparatus for connecting the feelers to the solenoids, and means comprising a system of interconnected levers for obtaining synchronous motion in, and a suitable gear ratio between said feelers and contact apparatus.

14. In electric jacquard apparatus, the combination of a pattern-cylinder, feelers movable thereon, a plurality of solenoids for controlling the warp threads, a movable contact-apparatus for connecting the feelers to the solenoids, and means comprising a system of adjustable, interconnected levers for obtaining synchronous motion in, and a suitable gear ratio between said feelers and contact apparatus.

15. In electric jacquard apparatus, the combination of a plurality of solenoids adapted to control the warp threads and divided into groups, each group of solenoids being connected to a group of contact-blocks and to a line selector, and means for uniting the groups of solenoids, contact-blocks and line selectors to form one exchangeable unit; each solenoid comprising an energizing winding and a bifilar winding connected in parallel therewith.

16. In electric jacquard apparatus, the combination of a plurality of solenoids adapted to control the warp threads and divided into groups, each group of solenoids being connected to a group of contact-blocks and to a line selector, and means for uniting the groups of solenoids, contact-blocks and line selectors to form one exchangeable unit; each of said solenoids comprising clamping springs mounted therein and a core adapted to be securely clamped by said springs when entering the solenoid.

17. In electric jacquard apparatus, the combination of a plurality of solenoids adapted to control the warp threads and divided into groups, each group of solenoids being connected to a group of contact-blocks and to a line selector, and means for uniting the groups of solenoids, contact-blocks and line selectors to form one exchangeable unit; each of said solenoids comprising clamping springs mounted outside the same and a core adapted to be securely clamped by said springs when entering the solenoid.

18. In electric jacquard apparatus, a ground and figure weave switch comprising in combination a frame, two sets of contact-members mounted opposite one another therein and each adapted to control one kind of weave, a single controlling chain mounted in said frame below said contact-members and comprising a plurality of lifting members on each of its link-pins, the lifting members on alternate pins being adapted to give the desired combinations for one kind of weave, and the contact-members being simultaneously actuated by the lifting members on adjacent pins, and means for intermittently feeding said chain the distance between the axes of two pins.

19. In electric jacquard apparatus, a ground and figure weave switch comprising in combination a frame, two sets of contact-members mounted therein opposite one another and at the same level and each adapted to control one kind of weave, a single controlling chain mounted in said frame below said contact-members and comprising a plurality of lifting members on each of its link-pins, the lifting members on alternate pins being adapted to give the desired combinations for one kind of weave, and the contact-members being simultaneously actuated by the lifting members on adjacent pins, and means for intermittently feeding said chain the distance between the axes of two pins.

20. In electric jacquard apparatus, a ground and figure weave switch comprising in combination a frame, two sets of contact-members mounted opposite one another therein and each adapted to control one kind of weave, a single controlling chain mounted in said frame below said contact-members and comprising a plurality of lifting members on each of its link-pins, the lifting members on alternate pins being adapted to give the desired combinations for one kind of weave, and the contact-members being simultaneously actuated by the lifting members on adjacent pins, means for intermittently feeding said chain the distance between the axes of two pins, and a plurality of resilient contact pieces insulatedly mounted in said frame and adapted to contact with said contact-members when the latter are raised by said lifting members.

21. In electric jacquard apparatus, a ground and figure weave switch comprising in combination a frame, two sets of contact-plates mounted opposite one another therein and each adapted to control one kind of weave, a single controlling chain mounted in said frame below said contact-plates and comprising a plurality of lifting members on each of its link-pins, the lifting members on alternate pins being adapted to give the desired combinations for one kind of weave, and the contact-plates being simultaneously actuated by the lifting members on adjacent pins, means for intermittently feeding said chain the distance between the axes of two pins, and a plurality of resilient contact pieces insulatedly mounted in said frame and adapted to contact with said contact-plates when the latter are raised by said lifting members.

In testimony whereof we have signed our names to this specification in the presence of two witnesses.

KARL FANTA.
AUGUST REGAL.
HANS VIETZE.
NORBERT WESSELY.

Witnesses:
JOHANN MENDEL,
KARL RICHTER.